(12) United States Patent
Yim et al.

(10) Patent No.: US 9,223,339 B2
(45) Date of Patent: Dec. 29, 2015

(54) PORTABLE TERMINAL WITH DETACHABLE PROTECTION COVER

(71) Applicant: Samsung Electronics Co. Ltd., Suwon-si, Gyeonggi-do (KR)

(72) Inventors: Dong-Jin Yim, Suwon-si (KR); Young-Wook Sohn, Seoul (KR); Byoung-Uk Yoon, Hwaseong-si (KR); Sang-Hyuck Jung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 232 days.

(21) Appl. No.: 13/892,086

(22) Filed: May 10, 2013

(65) Prior Publication Data

US 2013/0301204 A1    Nov. 14, 2013

(30) Foreign Application Priority Data

May 11, 2012  (KR) .................. 10-2012-0050005
Feb. 15, 2013  (KR) .................. 10-2013-0016509

(51) Int. Cl.
*G06F 1/16*  (2006.01)

(52) U.S. Cl.
CPC ............ *G06F 1/1601* (2013.01); *G06F 1/1626* (2013.01); *G06F 2200/1634* (2013.01)

(58) Field of Classification Search
USPC ............. 455/566, 575.3, 575.4, 454, 297, 99, 455/73, 59, 556.1; 439/629, 658, 263, 439/607.17, 395, 595, 404, 489, 153, 862, 439/154; 312/9.12, 9.15, 405, 107, 319.1, 312/326, 334.46, 334.47, 607.17; 361/679.07, 679.21, 679.01, 679.58, 361/679.43, 679.33, 679.55, 679.57, 361/679.03, 679.48, 679.47, 679.37
See application file for complete search history.

(56) References Cited

U.S. PATENT DOCUMENTS

| | | | |
|---|---|---|---|
| 5,204,805 A * | 4/1993 | Takahashi et al. | 361/720 |
| 2013/0172055 A1* | 7/2013 | Han | 455/566 |
| 2013/0265715 A1* | 10/2013 | Bae et al. | 361/679.55 |

FOREIGN PATENT DOCUMENTS

| | | |
|---|---|---|
| KR | 10-2010-0103083 A | 9/2010 |
| KR | 10-2011-0045972 A | 5/2011 |
| KR | 10-2011-0124535 A | 11/2011 |

* cited by examiner

*Primary Examiner* — Hung Duong
(74) *Attorney, Agent, or Firm* — Jefferson IP Law, LLP

(57) ABSTRACT

A portable terminal is provided. The portable terminal includes a mounting member configured to be capable of being attached to/detached from a housing of the portable terminal, a connection member configured to extend from the mounting member and to selectively enclose at least a part of the housing, and a cover element connected to an end of the connection member to open/close a display device installed on the front surface of the housing. The portable terminal provided with the protection cover has an advantage in that the increase of the thickness of the terminal can be minimized because the protection cover may be disposed on a side surface or an edge of the rear surface of the housing by the mounting member.

30 Claims, 18 Drawing Sheets

PORTABLE TERMINAL WITH DETACHABLE PROTECTION COVER

PRIORITY

This application claims the benefit under 35 U.S.C. §119 (a) of a Korean patent application filed on May 11, 2012 in the Korean Intellectual Property Office and assigned Serial No. 10-2012-0050005 and a Korean patent application filed on Feb. 15, 2013 in the Korean Intellectual Property Office and assigned Serial No. 10-2013-0016509, the entire disclosure of each of which is hereby incorporated by reference.

BACKGROUND OF THE INVENTION

1. Field of the Invention

The present invention relates to a portable terminal. More particularly, the present invention relates to a portable terminal that is provided with a detachable cover configured to open/close a display device.

2. Description of the Related Art

The term "portable terminal" denotes a device that allows a user who is carrying the portable terminal to communicate with another user or to access a desired service provided by a service provider through a mobile communication base station. Along with the development of mobile communication technologies and the information communication industry, the services accessible through portable terminals have quickly expanded. For example, the early mobile communication services were limited to the calling of a counterpart, a voice communication, a short message transmission, etc. However, the services have been gradually expanded to multimedia services such as moving images, entertainment services such as games, banking services such as mobile banking, etc. Also, the number of users of portable terminals has also expanded and now includes both youth and elderly people.

Recently, multimedia services provided through portable terminals have been strengthened, and portable terminals such as a smart phones or tablet Personal Computers (PCs) that come close to a conventional personal computer in function have been commercialized. Accordingly, an environment has been developed in which a person is capable of enjoying a moving image or the Internet and further conducting business using a smart phone or a tablet PC. In addition, as display devices using a touch screen replace keyboards configured by physical switches, portable terminals are provided with an expanded display device while also being miniaturized. Through this, the portable terminals have become satisfactory both in usability and portability. As the touch screen is implemented on a screen, a user may activate and use the keyboard function only when it is desired.

Expensive portable terminals such as smart phones and tablet PCs are provided with and protected by a separate protection cover. That is, an accessory such as a separate cover is used to prevent damage in appearance or destruction caused by scratches, impact or the like during ordinary usage.

FIG. 1 is a perspective view illustrating a portable terminal in a state where a protection cover is coupled to the portable terminal according to the related art. FIG. 2 is a side view of the portable terminal illustrated in FIG. 1 according to the related art. FIG. 3 is a side view of the portable terminal illustrated in FIG. 1 in a state where the protection cover is coupled to the portable terminal according to the related art.

Referring to FIGS. 1 to 3, a flat or bar-type portable terminal 10 is used in a state where a separate protection cover 21 is coupled to the portable terminal 10. Although not illustrated, a display device may be mounted on the front surface of the terminal 10. Some products may be provided with an illumination sensor, a camera module or the like adjacent to the display device. In addition, connection holes 13 are provided on a side surface 11 so as to connect the terminal 10 with an external device such as an earphone or a computer or to mount a storage medium, and a power key or a volume key is also provided on the side surface 11 or another side surface of the terminal 10. An additional camera module for photographing a subject may be disposed on the rear surface of the terminal 10.

Typically, the protection cover 21 is configured to be bound to the side surface 11 or an edge of the front surface of the terminal 10 and to enclose the rear surface of the terminal 10. Such a protection cover 21 may be formed of various materials, for example, a flexible material such as a silicon, urethane, or leather, or a rigid material such as a synthetic material. In order to form a strong joint structure with the terminal while absorbing impact, the protection cover 21 may be fabricated by combining a frame formed of a synthetic material and a flexible material.

Referring to FIGS. 2 and 3, the protection cover 21 is coupled to enclose the rear surface and a part of the side surfaces of the terminal 10, and is provided with a photographing opening 23 positioned on the rear surface of the terminal 10 so as to provide a photographing path of the camera module installed in the rear surface of the terminal 10. In addition, even if the protection cover 21 is coupled to enclose the side surfaces 11 of terminal 10, it is desirable that the protection cover 21 is fabricated in a shape that opens the connection hole 13.

Meanwhile, a protection cover that encloses the rear surface, side surfaces and front surfaces of the terminal is also used. In general, a terminal such as a tablet PC that is provided with a large screen while being portable is provided a touch screen in a high performance display device and thus, it is required to protect the display device, in particular the surface of a display window. Accordingly, users occasionally purchase a protection cover that is additionally provided with a cover element for opening/closing the front surface of the terminal while being bound to the terminal to enclose the rear surface and side surfaces of the terminal.

However, the protection cover configured to enclose the rear surface and the front surface of the terminal has a disadvantage in that it increases the entire thickness and the weight of the terminal when carrying the terminal. Moreover, because such a protection cover is configured to enclose the rear surface of the terminal, there is a problem in that the protection cover prevents the terminal from exhibiting its distinctiveness in relation to any other product.

In a case of a terminal provided with a detachable battery cover, the user may implement a structure formed by connecting a cover element to the detachable battery cover, and may selectively use a battery cover coupled with the cover element and a battery cover not coupled with the cover element as desired.

Whereas, in a case of a terminal having a battery built in the inside of the terminal so that the user cannot replace the battery with another battery, it is inevitable to use a protection cover configured to enclose the rear surface of the terminal even if the user uses the protection cover only for protecting the display device. That is, when a flat or bar-type terminal is a battery built-in type, it is inevitable to use a structure that covers the rear surface of the terminal in order to secure a binding structure between the terminal and the protection cover although the user desires to use a protection cover only for protecting the display device.

Therefore, a need exists for a portable terminal that is provided with a protection cover that reveals an external appearance design so as to secure distinctiveness as compared to other products.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a portable terminal that is provided with a protection cover that reveals an external appearance design so as to secure distinctiveness as compared to other products.

Another aspect of the present invention is to provide a portable terminal with a protection cover configured to be easily detached as desired even if the portable terminal does not have a removable battery cover.

Another aspect of the present invention is to provide a portable terminal that can suppress an increase in the thickness of the portable terminal even if a protection cover is coupled to the portable terminal.

In accordance with an aspect of the present invention, a portable terminal is provided. The portable terminal includes a mounting member configured to be capable of being attached to/detached from a housing of the portable terminal, a connection member configured to extend from the mounting member and to selectively enclose at least a part of the housing, and a cover element connected to an end of the connection member to open/close a display device installed on the front surface of the housing.

In accordance with another aspect of the present invention, a portable terminal is provided. The portable terminal includes a housing having a display device installed on the front surface thereof, a mounting recess formed on the rear surface of the housing, a mounting member and a dummy member that are provided to be individually attachable to/detachable from the housing, a connection member configured to extend from the mounting member and to selectively enclose at least a part of the housing, and a cover element connected to an end of the connection member. Either the mounting member or the dummy member is coupled to the mounting recess, and, when the mounting member is coupled to the mounting recess, the cover element opens/closes the display device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
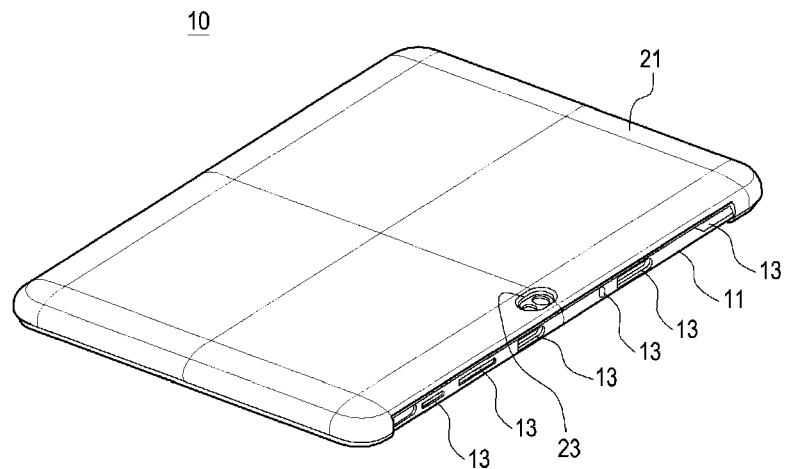
FIG. 1 is a perspective view illustrating a portable terminal in a state where a protection cover is coupled to the portable terminal according to the related art.
Figure 2:
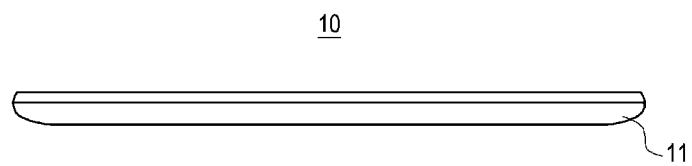
FIG. 2 is a side view of the portable terminal illustrated in FIG. 1 according to the related art.
Figure 3:
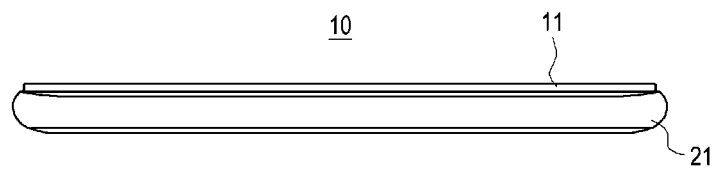
FIG. 3 is a side view of the portable terminal illustrated in FIG. 1 in a state where the protection cover is coupled to the portable terminal according to the related art.
Figure 4:
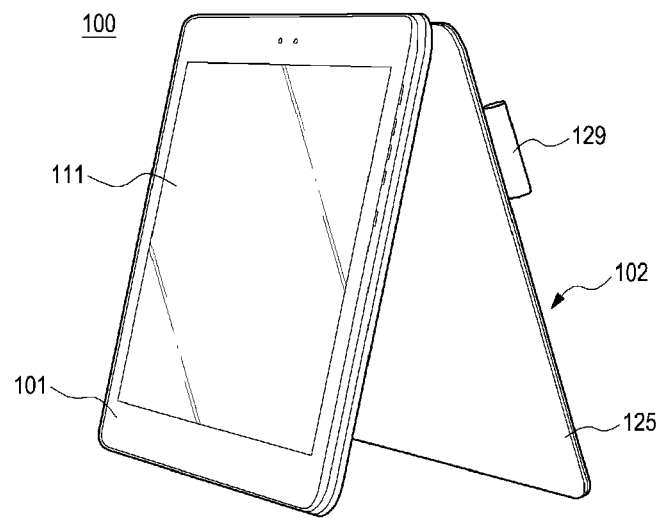
FIG. 4 is a perspective view illustrating a portable terminal according to an exemplary embodiment of the present invention.
Figure 5:
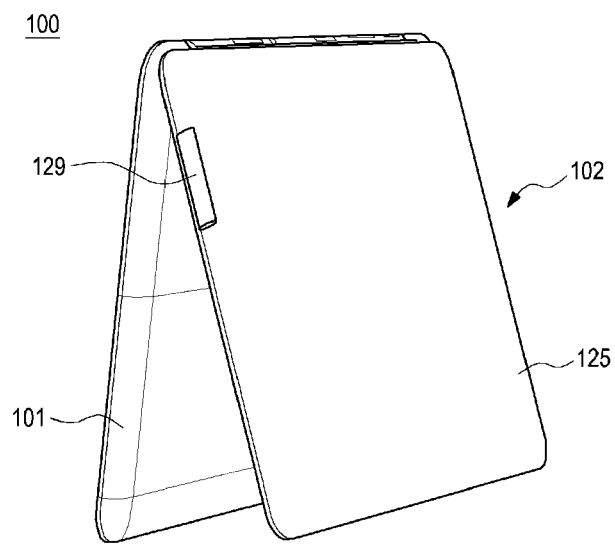
FIG. 5 is a perspective view illustrating the portable terminal illustrated in FIG. 4 viewed in a different direction according to an exemplary embodiment of the present invention.
Figure 6:
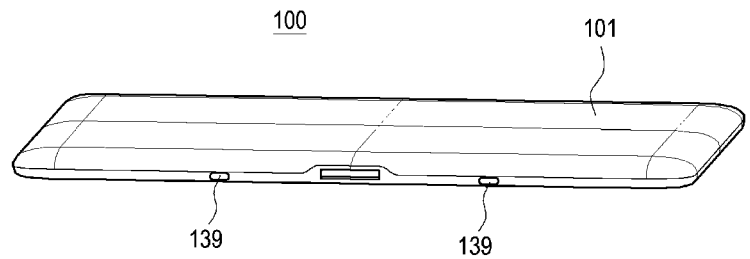
FIG. 6 is a perspective view illustrating the portable terminal illustrated in FIG. 4 in a state where a friction member is installed in the housing of the portable terminal according to an exemplary embodiment of the present invention.

FIG. 4 is a perspective view illustrating a portable terminal according to an exemplary embodiment of the present invention. FIG. 5 is a perspective view illustrating the portable terminal illustrated in FIG. 4 viewed in a different direction according to an exemplary embodiment of the present invention. FIG. 6 is a perspective view illustrating the portable terminal illustrated in FIG. 4 in a state where a friction member is installed in the housing of the portable terminal according to an exemplary embodiment of the present invention.

Referring to FIGS. 4 to 6, a portable terminal 100 according to an exemplary embodiment of the present invention includes a protection cover 102 that is detachably provided to the housing 101 of the terminal 100. At this time, the protection cover 102 may include a mounting member 121 directly attached to or detached from the housing 101, a cover element 125 for opening/closing a display device 111 installed on the front surface of the housing 101, and a connection member 123 for connecting the cover element 125 to the mounting member 121.

The terminal 100 is provided with the display device 111 installed on the front surface of the housing 101, and an illumination sensor or a camera module is installed adjacent to the display device 111. The camera module installed adjacent to the display device 111 may be conveniently used when a user desires to perform an image communication or to photograph the user himself or herself. A speakerphone hole or a microphone hole is formed in the front surface or a side surface of the housing 101 so as to allow the inputting/outputting of a sound. In addition, referring to FIG. 15, a plurality of connection holes 113 are provided on a side surface of the housing 101 so as to mount a storage medium or to connect an external device, and physical keys such as a power key and a volume control key may also be installed on the side surface. The terminal 100 may further include another camera module installed on the rear surface of the housing 101. The camera module installed on the housing 101 is provided for photographing a subject, and when the camera module is in a state where it is capable of communicating with a program suitable for the terminal 100, it is possible to implement an augmented reality function through the camera module installed on the rear surface of the housing 101.

Referring to FIG. 6, at least one friction member 139 may be installed on another side surface of the housing 101 (e.g., the surface opposite to the surface formed with the connection holes 113 in an exemplary embodiment of the present invention). The terminal 100 may be cradled to be inclined in relation to a plane by the protection cover 102. At this time, the friction member 139 prevents the terminal 100 from sliding in the state where the terminal 100 is supported on the plane and cradled to be inclined. The friction member 139 has a shape extending in the longitudinal direction on the side surface of the housing 101, and one or a plurality of frictional members 139 may be installed depending on the length thereof.

Figure 7:
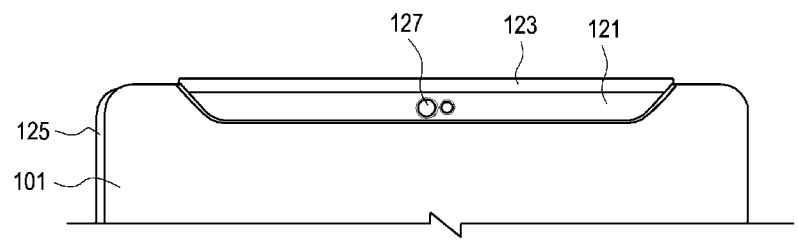
FIG. 7 is a partial top plan view illustrating the portable terminal illustrated in FIG. 4 in a state where a mounting member of the portable terminal is coupled to the housing according to an exemplary embodiment of the present invention.
Figure 8:
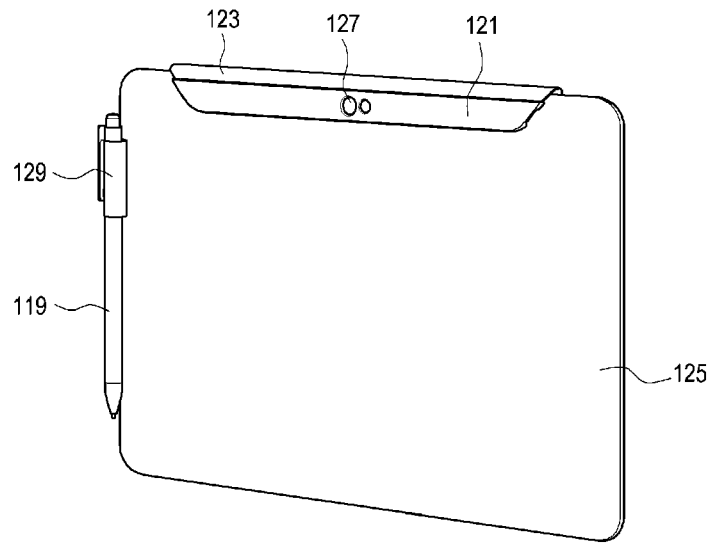
FIG. 8 is a perspective view illustrating a cover of the portable terminal illustrated in FIG. 4 according to an exemplary embodiment of the present invention.
Figure 9:
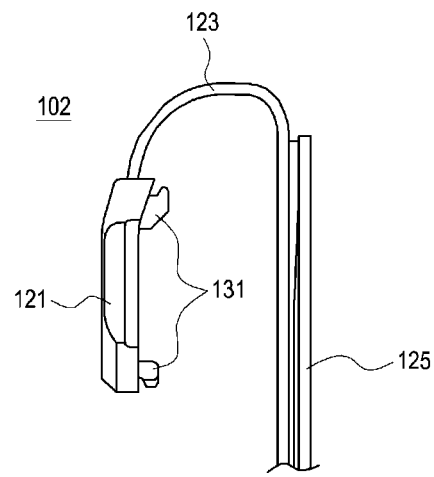
FIG. 9 is a side view of the cover illustrated in FIG. 8 according to an exemplary embodiment of the present invention.
Figure 10:
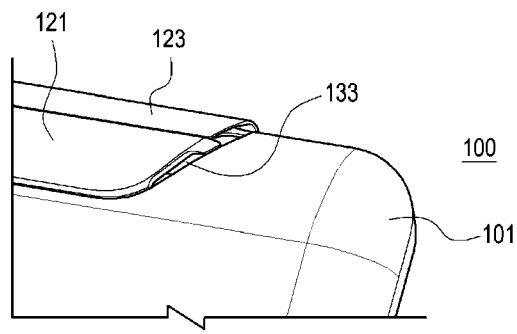
FIG. 10 is a perspective view illustrating a part of the mounting member as illustrated in FIG. 7 in an enlarged scale according to an exemplary embodiment of the present invention.

FIG. 7 is a partial top plan view illustrating the portable terminal illustrated in FIG. 4 in a state where a mounting member of the portable terminal is coupled to the housing according to an exemplary embodiment of the present invention. FIG. 8 is a perspective view illustrating a cover of the portable terminal illustrated in FIG. 4 according to an exemplary embodiment of the present invention. FIG. 9 is a side view of the cover illustrated in FIG. 8 according to an exemplary embodiment of the present invention. FIG. 10 is a perspective view illustrating a part of the mounting member as illustrated in FIG. 7 in an enlarged scale according to an exemplary embodiment of the present invention.

Referring to FIGS. 7 to 10, the protection cover 102 is configured by the mounting member 121, the connection member 123, and the cover element 125.

Figure 11:
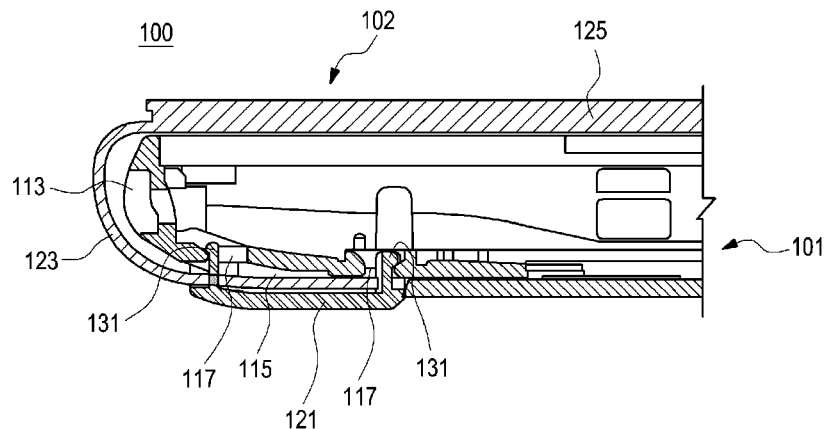
FIG. 11 is a cross-sectional view illustrating the portable terminal illustrated in FIG. 4 in a state where the cover member closes the front surface of the housing according to an exemplary embodiment of the present invention.
Figure 12:
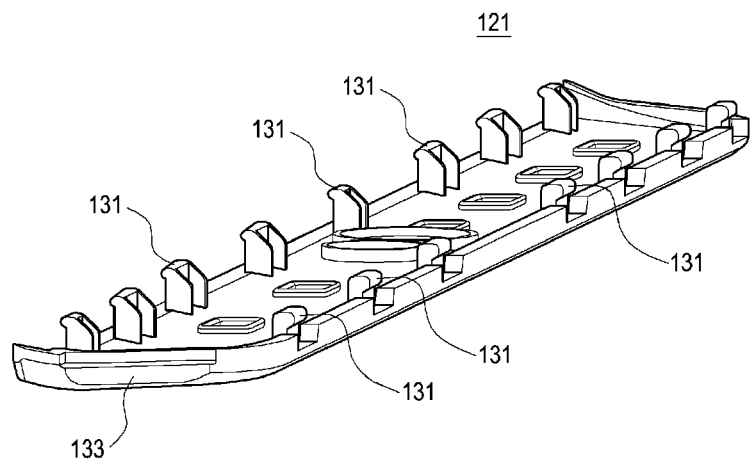
FIG. 12 is a perspective view illustrating the mounting member illustrated in FIG. 7 according to an exemplary embodiment of the present invention.

FIG. 11 is a cross-sectional view illustrating the portable terminal illustrated in FIG. 4 in a state where the cover member closes the front surface of the housing according to an exemplary embodiment of the present invention. FIG. 12 is a perspective view illustrating the mounting member illustrated in FIG. 7 according to an exemplary embodiment of the present invention.

Referring to FIGS. 11 and 12, the mounting member 121 is configured to be attachable to/detachable from the housing 101. At this time, the housing 101 is formed with a mounting recess 115 so as to provide a space to which the mounting member 121 is coupled. The mounting recess 115 is positioned at a side edge on the rear surface of the housing 101, and may extend in the longitudinal direction of the housing

101, that is, in the direction parallel to the corner of the side edge of the housing 101. The mounting member 121 may be formed with a photographing opening 127. In case where a camera module is installed on the rear surface of the housing 101, the camera module may be protected by the mounting member 121 and secure a photographing path through the photographing opening 127.

A plurality of fastening studs 131 are formed on the inner surface of the mounting member 121. The fastening studs 131 are arranged in the longitudinal direction of the mounting member 121 at the opposite side edges, the fastening studs 131 positioned at one edge and the fastening studs 131 positioned at the other edge are formed with protrusions on the opposite outer sides thereof, respectively. A plurality of fastening holes 117 are formed in the mounting recess 115 to correspond with the fastening studs 131, respectively. The fastening holes 117 are arranged along the longitudinal direction of the mounting recess 115 at the opposite side edges of the mounting recess 115. When the mounting member 121 is coupled to the mounting recess 115, each of the fastening studs 131 is engaged with one of the fastening holes 117, and the outer surfaces of the fastening studs 131, more specifically, the protrusions, are directly bound to the insides of the fastening holes 117, respectively.

The mounting member 121 having the fastening structure as described above may further include a separation recess 133 formed at one side thereof so that the mounting member 121 can be easily separated from the housing 101. A user may separate the mounting member 121 from the one side by inserting a nail, a clip or the like into the separation recess 133. At this time, the protrusions positioned at one edge of the mounting member 121 and the protrusions positioned at the other edge of the mounting member 121 may be formed to be more inclined away from each other as being positioned farther away from one end of the mounting member 121. This will be described in more detail below with respect to the dummy member 221.

The connection member 123 is configured to connect the cover element 125 to the mounting member 121 and may be formed of a flexible material so that the cover element 125 opens/closes the display device 111. An end of the connection member 123 is fixed to the inner surface of the mounting member 121. At this time, if the mounting member 121 is formed of a synthetic material and the connection member 123 is formed of a material such as silicon, urethane, or rubber, the connection member 123 may be fixed to the inner surface of the mounting member 121 through welding. The connection member 123 is provided in such a manner that, when the mounting member 121 is coupled to the housing 101, the connection member 123 encloses one side surface of the housing 101, more specifically, the side surface adjacent to the position where the mounting member 121 is mounted. In an exemplary embodiment of the present invention, the connection holes 113 are positioned on the one side surface of the housing 101 adjacent to the position where the mounting member 121 is mounted. Accordingly, the connection holes 113 may be opened/closed by the connection member 123.

The cover element 125 is connected to an end of the connection member 123 and pivots on the housing 101 so as to open/close the display device 111. As described above, the protection cover 102, more specifically, the cover element 125 supports the housing 101 in such a manner that the housing 101 can be cradled to be inclined on a plane. Referring again to FIGS. 4 and 5, in a state where the cover element 125 is positioned to be inclined while facing the rear surface of the housing 101, one edge of the cover element 125 and one side surface of the housing 101 may be respectively supported on the plane. At this time, as in the case where the friction member 139 is installed so as to prevent the housing 101 from sliding, the edge of the cover element 125 supported on the plane may also be finished using a material which is the same as that of the friction member 139 so as to prevent the cover element 125 from sliding on the plane. As such, the user may conveniently enjoy a moving image in the state where the terminal 100 is cradled on the plane.

The terminal 100 may further include an accommodating member 129 provided on the protection cover 102. The accommodating member 129 is provided so as to couple an additional device such as, for example, a stylus pen 119 and the stylus pen 119 may be incorporated with a capacitive touch function. The user may conveniently carry the stylus pen 119 by coupling the stylus pen 119 to the accommodating member 129. Although the present exemplary embodiment illustrates a construction in which the stylus pen 119 is coupled to the accommodating member 129, the accommodating member 129 may be conveniently used when carrying a head set or the like if the accommodating member 129 is formed using a ribbon, Velcro, or the like.

Figure 13:
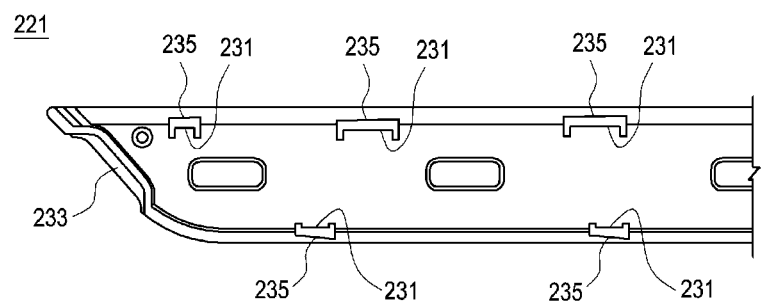
FIG. 13 is a top plan view illustrating a dummy member provided in the portable terminal illustrated in FIG. 4 according to an exemplary embodiment of the present invention.
Figure 14:
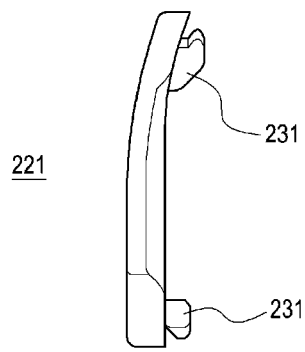
FIG. 14 is a side view of the dummy member illustrated in FIG. 13 according to an exemplary embodiment of the present invention.
Figure 15:
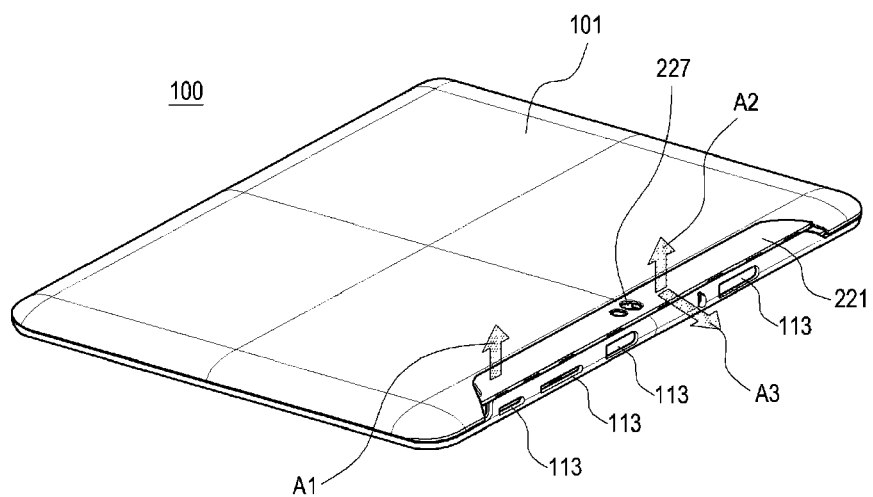
FIG. 15 is a perspective view illustrating the portable terminal illustrated in FIG. 4 in a state where the dummy member illustrated in FIG. 13 is coupled to the housing of the portable terminal according to an exemplary embodiment of the present invention.
Figure 16:
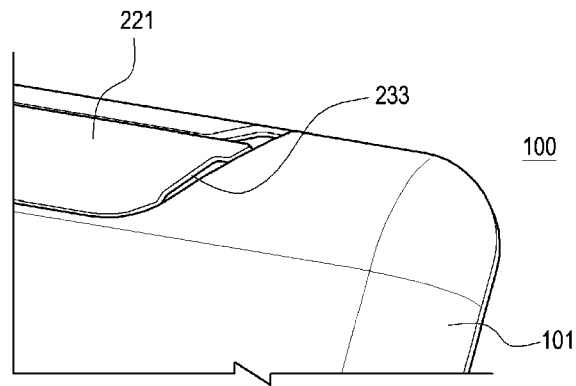
FIG. 16 is a perspective view illustrating a part of the dummy member and the portable terminal illustrated in FIG. 15 in an enlarged scale according to an exemplary embodiment of the present invention.
Figure 17:
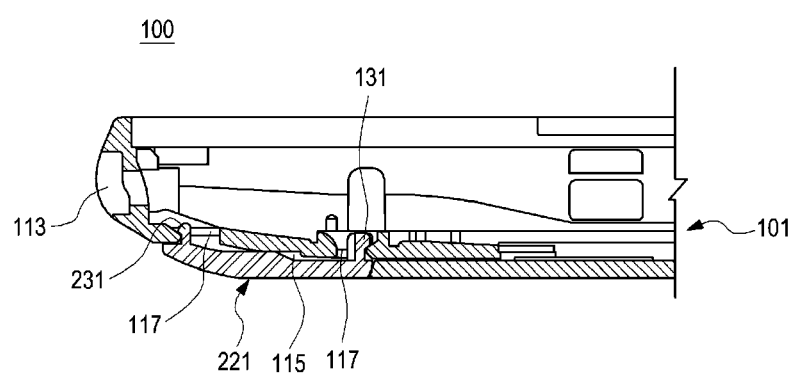
FIG. 17 is a cross-sectional view illustrating a part of the portable terminal illustrated in FIG. 15 according to an exemplary embodiment of the present invention.
Figure 18:
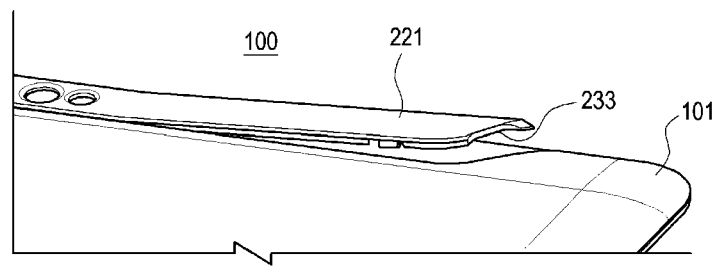
FIG. 18 is a perspective view illustrating a state where the dummy member illustrated in FIG. 15 is being removed from the housing of the portable terminal according to an exemplary embodiment of the present invention.

FIG. 13 is a top plan view illustrating a dummy member provided in the portable terminal illustrated in FIG. 4 according to an exemplary embodiment of the present invention. FIG. 14 is a side view of the dummy member illustrated in FIG. 13 according to an exemplary embodiment of the present invention. FIG. 15 is a perspective view illustrating the portable terminal illustrated in FIG. 4 in a state where the dummy member illustrated in FIG. 13 is coupled to the housing of the portable terminal according to an exemplary embodiment of the present invention. FIG. 16 is a perspective view illustrating a part of the dummy member and the portable terminal illustrated in FIG. 15 in an enlarged scale according to an exemplary embodiment of the present invention. FIG. 17 is a cross-sectional view illustrating a part of the portable terminal illustrated in FIG. 15 according to an exemplary embodiment of the present invention. FIG. 18 is a perspective view illustrating a state where the dummy member illustrated in FIG. 15 is being removed from the housing of the portable terminal according to an exemplary embodiment of the present invention.

Referring to FIGS. 13-18, the terminal 100 may further include a dummy member 221. When the protection cover 102 is not used, the user may use the dummy member 221 by coupling the dummy member 221 in the mounting recess 115. That is, the dummy member 221 also extends in the longitudinal direction of the housing 101. The dummy member 221 may also include fastening studs 231, a separation recess 233, and a photographing opening 227, similar to the mounting member 121. At this time, since the dummy member 221 is used when the terminal 100 is used or carried in a state where the protection cover 102 is separated from the terminal 100, the dummy member 123 is positioned on the housing 101 to be lower than the mounting member 121 substantially by the thickness of the connection member 123. Accordingly, the fastening studs 231 formed on the dummy member 221 may be formed to be substantially shorter than the fastening studs 231 formed on the mounting member 121. Upon comparing FIG. 11 and FIG. 17, since the connection member 123 is interposed between the mounting member 121 and the mounting recess 115, the fastening studs of the mounting member 121 bounded to the fastening holes 117 through the connection member 123 should be formed to be longer than the fastening studs 231. In addition, although the outer surface of the dummy member 221 is substantially coplanar with the rear surface of the housing 101, the outer surface of the mounting member 121 slightly protrudes from the rear surface of the housing 101. However, since the height of the mounting member 121 protruding from the rear surface of the housing 101 may be limited within 1 mm, the protection cover 102 may be used by being coupled to the housing 101 while substantially suppressing the thickness of the terminal 100.

Referring to FIGS. 13 and 14, the fastening studs 231 of the dummy member 221 are also arranged in the longitudinal direction of the dummy member 221 at the opposite side edges of the dummy member 221, and are formed with protrusions 235 on the outer surfaces thereof, respectively. In fact, the protrusions are directly bound to the fastening holes 117. At this time, it is desirable that the protrusions 235 positioned at one edge of the dummy member 221 and the protrusions 235 positioned at the other edge are formed to be more inclined away from each other as being positioned further away from one end of the dummy member 221, in other words, from the separation recess 233. The inclined shape of the protrusions 235 is to provide a strong binding force while allowing the user to easily separate the dummy member 221 from the housing 101. As described above, the protrusions formed on the mounting member 121 also have an inclined shape so that the protrusions may provide a strong binding force while allowing the user to easily separate the mounting member 121.

Referring to FIGS. 15 and 18, it is apparent that due to the inclined shape, the protrusions 235 provide a weak binding force as approaching the separation recess 233 and provide a strong binding force as being remote from the separation recess 233. Accordingly, as illustrated in FIG. 18, when the dummy member 221 is separated from housing 101 starting from the portion where the separation recess 233 is formed, the protrusions 235 are disengaged from the fastening holes 117 starting from the portion where the binding force is weak. When some of the protrusions 235 are disengaged from the fastening holes 117, the fastening studs 231 are deformed so that the entirety of the protrusions 235 can be easily disengaged from the fastening holes 117.

Referring to FIG. 15, when applying a force in the direction indicated by arrow A1 at the separation recess 133, either the mounting member 121 or the dummy member 221 was separated from the housing 101 by a force of not more than 3 kgf. Whereas, depending on the direction or point where the force was applied, the force required for separating either the mounting member 121 or the dummy member 221 was greatly increased. For example, when the force was applied at the central portion of the dummy member 221, more specifically an area adjacent to the photographing opening 227 in the direction indicated by arrow A2, the dummy member 221 was separated from the housing 101 only when the force of 10 kgf or more was applied, and, in the direction indicated by arrow A3, the dummy member 221 was separated from the housing 101 only when the force of 29 kgf or more was applied.

Like this, as each of the fastening studs 131 and 231, specifically the protrusions 235 formed on the outer surfaces of the fastening studs 131, 231 is formed to be inclined in a predetermined direction, the mounting member 121 and the dummy member 221 may allow the user to easily separate them while being strongly coupled to the housing 101.

FIGS. 19 to 26 exemplify modified structures for coupling the mounting member and the dummy member to the housing, according to an exemplary embodiment of the present invention.

Figure 19:
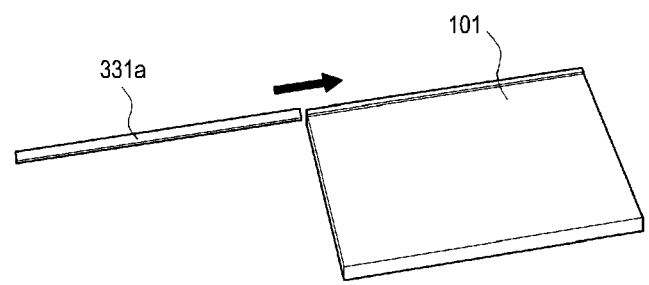
FIGS. 19 to 26 are views for describing modified embodiments of the mounting member illustrated in FIG. 7, according to an exemplary embodiment of the present invention.
Figure 20:
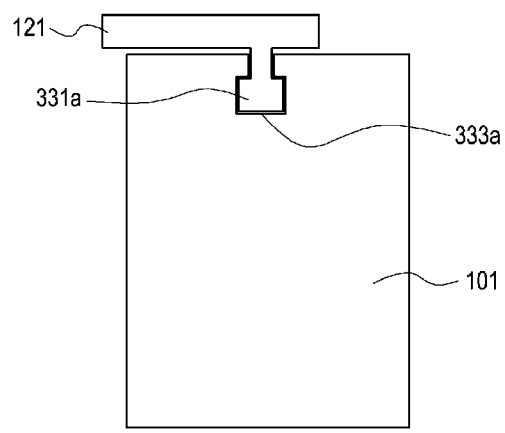

FIGS. 19 and 20 illustrate a binding structure using an elongated channel 333a extending in one direction, and a binding rib 331a formed on each of the mounting member 121 and the dummy member 221. The elongated channel 333a is formed in the housing 101 and extends along the longitudinal direction of the housing 101. The binding rib 331a also extends in the longitudinal direction of the housing 101. At this time, the binding rib 331a is fabricated having an under-cut structure such that its lower portion is formed to have a wider width. The cross-sectional shape of the elongated channel 333a also corresponds to that of the binding rib 331a. The binding rib 331a is inserted into an end of the elongated channel 333a along the longitudinal direction of the housing 101 (i.e., in the extension direction of the elongated channel 333a) so as to bind the mounting member 121 to the housing 101. At this time, because the binding rib 331a has an under-cut structure and the elongated channel 333a also has a shape corresponding to that of the binding rib 331a, the binding rib 331a can be coupled to the elongated channel 333a only in its extending direction.

Figure 21:
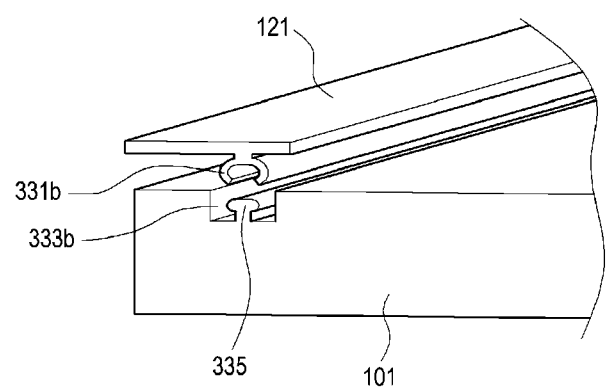
Figure 22:
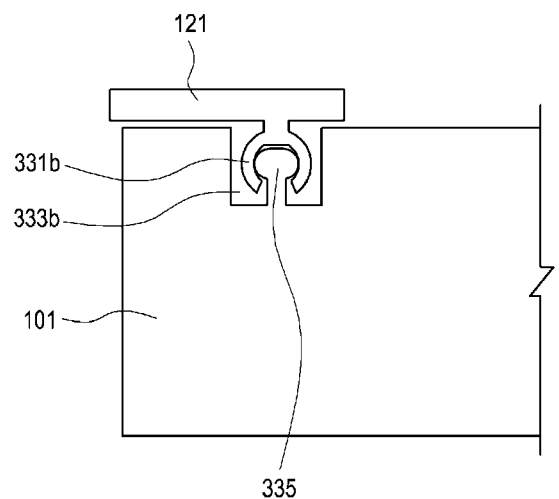

FIGS. 21 and 22 illustrate a construction in which an elongated channel 333b and a first binding rib 335 are formed in the housing 101 and a second binding rib 331b is formed in each of the mounting member 121 and the dummy member 221. The first binding rib 335 is formed to protrude from the inner wall of the elongated channel 333b and to have an under-cut structure. When the mounting member 121 or the dummy member 221 is coupled to the housing 101, the second binding rib 331b is inserted into the elongated channel 333b in a state where the second binding rib 331b wraps the upper portion of the first binding rib 335. When the second binding rib 331b is also formed in an under-cut structure and the elongated channel 333b is formed to have a cross-section corresponding to that of the second binding rib 331b, the second binding rib 331b is inserted into the elongated channel 333b from one end of the elongated channel 333b to be coupled to the elongated channel 333b, as in the modified example illustrated in FIGS. 19 and 20. In the construction illustrated in FIGS. 21 and 22, although the second binding rib 331b is accommodated in the elongated channel 333b, the second binding rib 331b is coupled to wrap the upper portion of the first binding rib 335 of the under-cut structure rather than being bound to the elongated channel 333b so as to couple the mounting member 121 or the dummy member 221 to the housing 101. Accordingly, in the binding structure illustrated in FIGS. 21 and 22, the second binding rib 331b may be inserted in the extension direction of the elongated channel 333b, or, referring to FIG. 21, the second binding rib 331b may be forcibly inserted into the elongated channel 333b in a state where the mounting member 121 or the dummy member 221 faces the housing 101.

Figure 23:
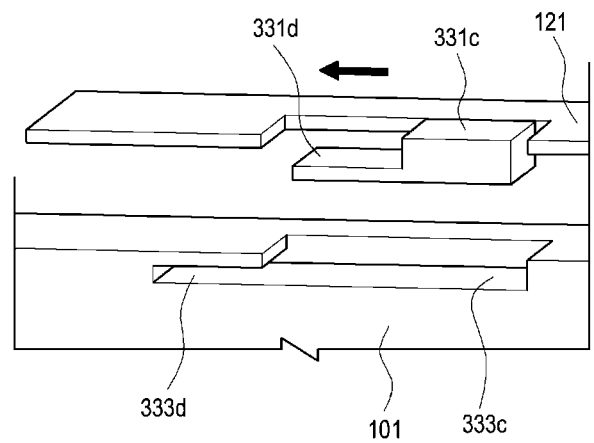
Figure 24:
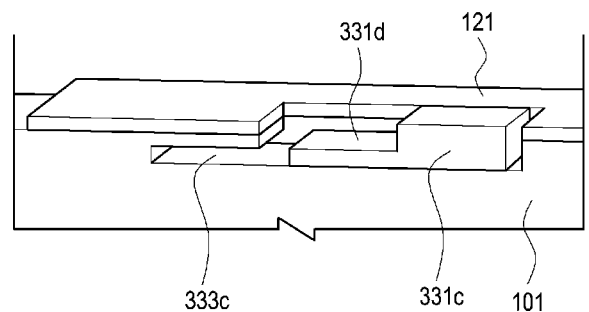
Figure 25:
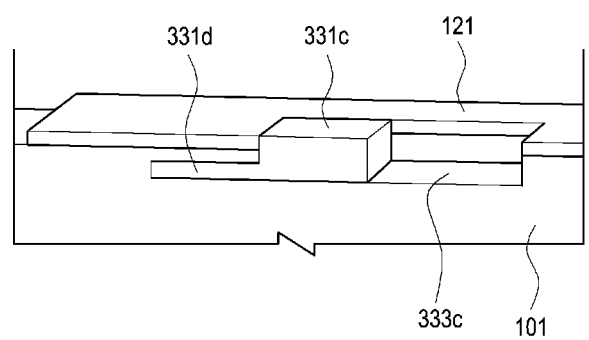

FIGS. 23 to 25 exemplify a construction in which a slide hole 333c is formed in the housing 101 and a slide lever 331c is provided to be slidable on each of the mounting member 121 and the dummy member 221. The slide lever 331c includes a binding piece 331d extending laterally, and the slide hole 333c includes a binding hole 333d extending laterally from an inner wall of the binding hole 333d. When the mounting member 121 or the dummy member 221 is positioned on the housing 101, the slide lever 331c is accommodated in the slide hole 333c. When the slide lever 331c is slid in the slide hole 333c, the binding piece 331d is engaged in the binding hole 333d, thereby coupling the mounting member 121 or the dummy member 221 to the housing 101.

In the construction illustrated in FIGS. 23 and 24, it is illustrated that the slide lever 331c is linearly moved. However, the slide lever 331c may be configured to be rotatable. That is, an opening may have a shape corresponding to that of the slide lever and the binding piece is formed on the outer surface of the housing 101 and a binding hole extending laterally from the inner wall of the opening with the above-described shape so that the binding piece is introduced into the binding hole by rotating the slide lever. In this case, it is apparent that the slide lever should be formed in a cylindrical shape.

Figure 26:
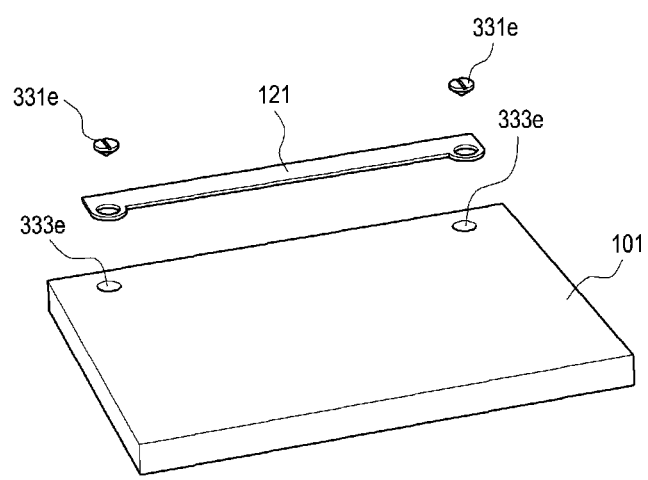

The modified example of FIG. 26 illustrates a construction in which a screw hole 333e formed in the housing 101 and the mounting member 121 or the dummy member 221 is directly fastened and bound to the housing 101 using a fastening member 331e such as a screw. In this case, it would be desirable that the user may handle the fastening member 331e even without using a nail or a tool such as a coin.

As described above, the construction for binding the mounting member 121 and the dummy member 221 to the housing 101 may be variously implemented, and may be configured by combining the above-described modified examples.

Figure 27:
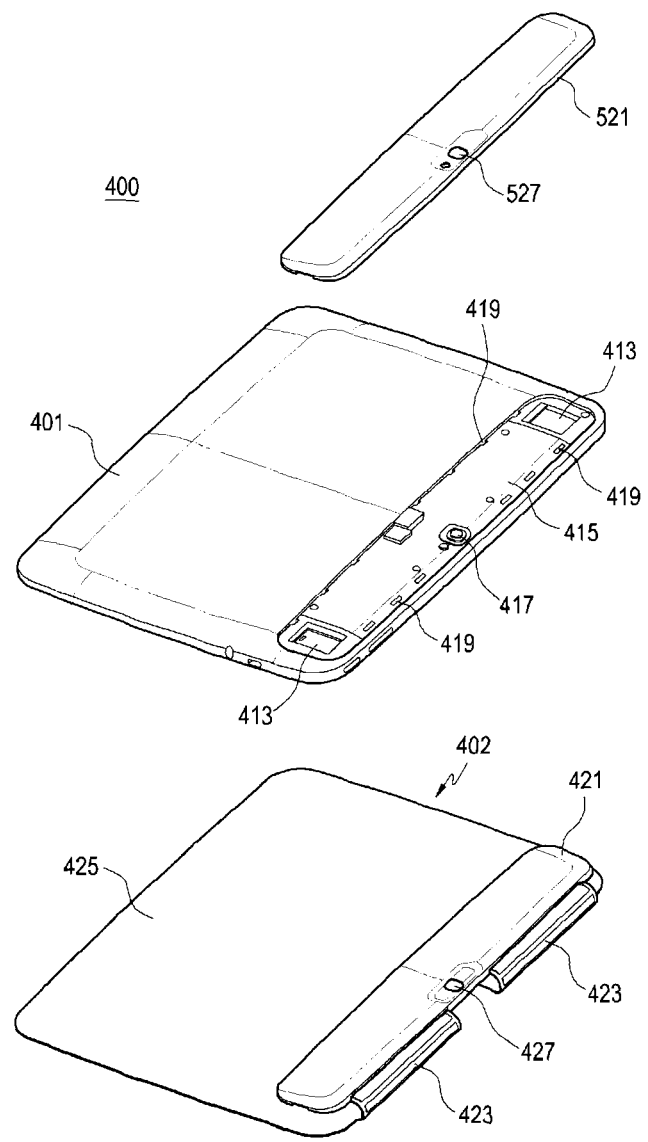
FIG. 27 is an exploded perspective view illustrating a portable terminal according to another exemplary embodiment of the present invention.
Figure 28:
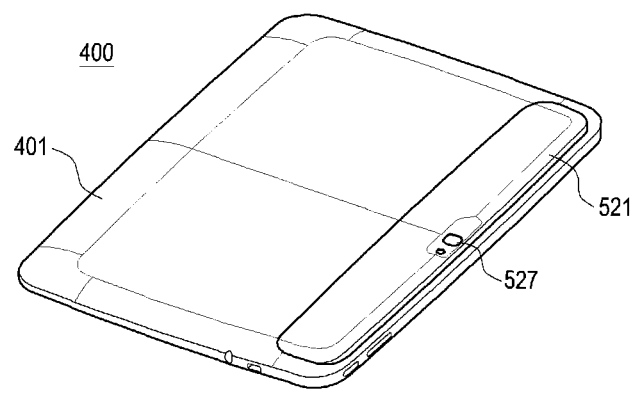
FIG. 28 is a perspective view illustrating the portable terminal illustrated in FIG. 27 in a state where a dummy member is coupled to the portable terminal according to an exemplary embodiment of the present invention.
Figure 29:
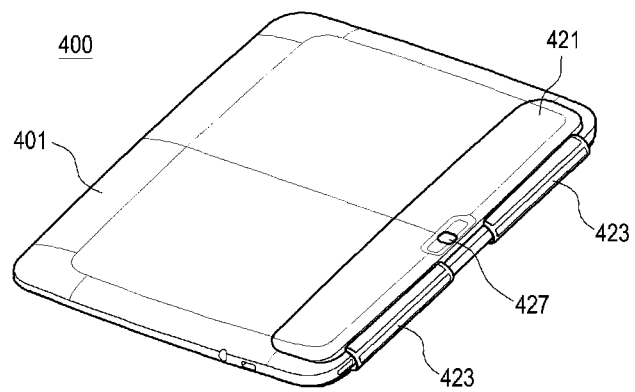
FIGS. 29 and 30 are perspective views illustrating the portable terminal illustrated in FIG. 27 in a state where a protection cover is coupled to the portable terminal, respectively according to an exemplary embodiment of the present invention.
Figure 30:
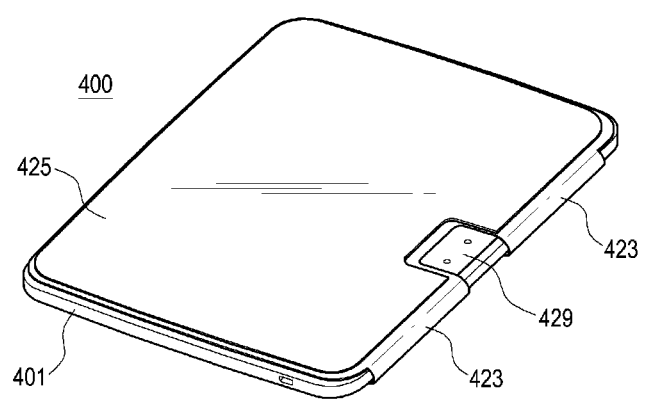
Figure 31:
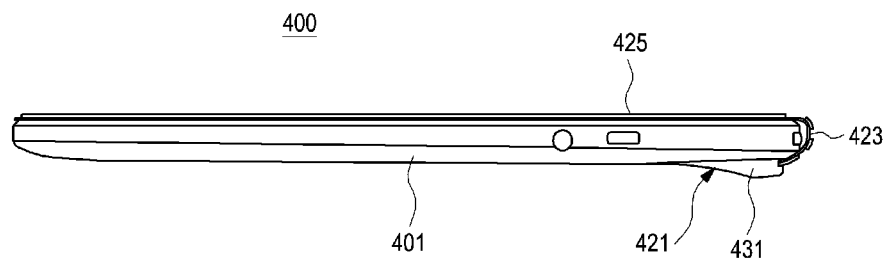
FIG. 31 is a side view of the portable terminal illustrated in FIG. 29 according to an exemplary embodiment of the present invention.
Figure 32:
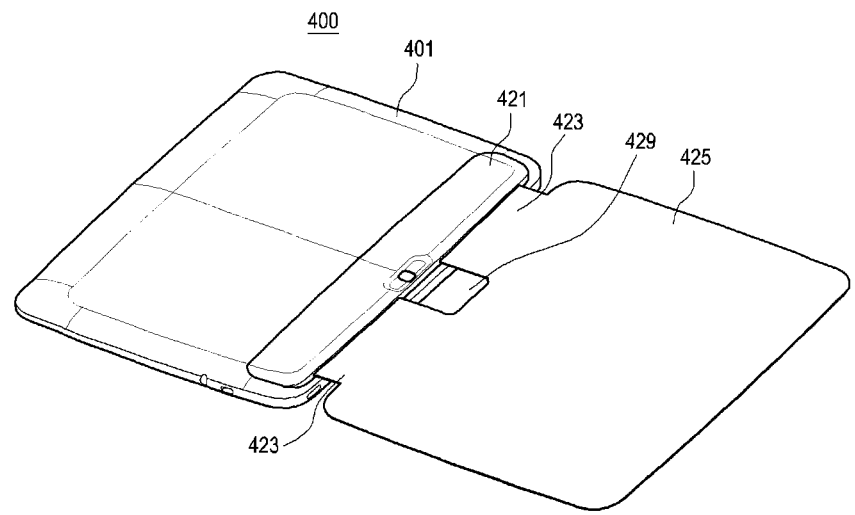
FIGS. 32 and 33 are perspective views illustrating the portable terminal illustrated in FIG. 29 in a state where the front surface of the portable terminal is opened, respectively according to an exemplary embodiment of the present invention.
Figure 33:
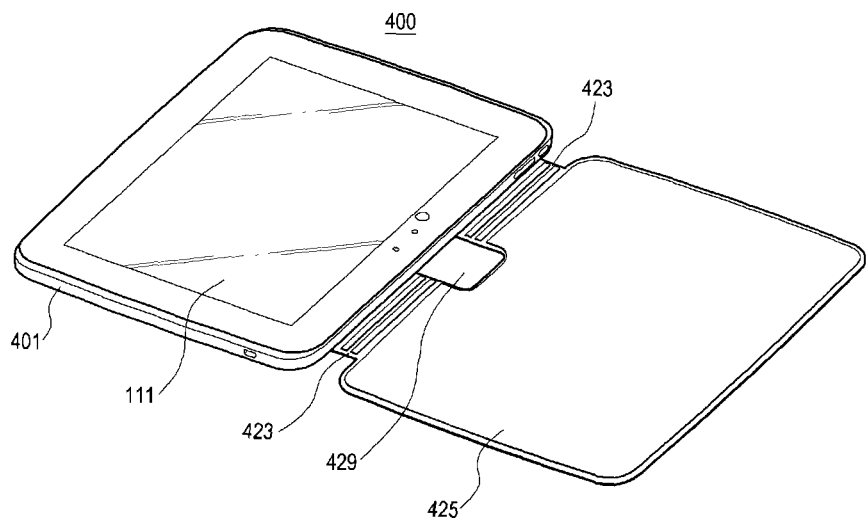
Figure 34:
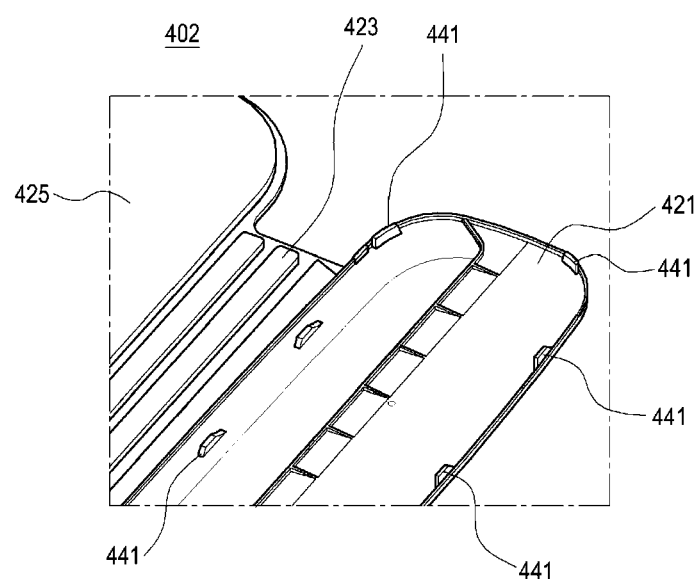
FIG. 34 is a perspective view illustrating a part of the protection cover illustrated in FIG. 27 in an enlarged scale according to an exemplary embodiment of the present invention.

FIG. 27 is an exploded perspective view illustrating a portable terminal according to another exemplary embodiment of the present invention. FIG. 28 is a perspective view illustrating the portable terminal illustrated in FIG. 27 in a state where a dummy member is coupled to the portable terminal according to an exemplary embodiment of the present invention. FIGS. 29 and 30 are perspective views illustrating the portable terminal illustrated in FIG. 27 in a state where a protection cover is coupled to the portable terminal, respectively according to an exemplary embodiment of the present invention. FIG. 31 is a side view of the portable terminal illustrated in FIG. 29 according to an exemplary embodiment of the present invention. FIGS. 32 and 33 are perspective views illustrating the portable terminal illustrated in FIG. 29 in a state where the front surface of the portable terminal is opened, respectively according to an exemplary embodiment of the present invention. FIG. 34 is a perspective view illustrating a part of the protection cover illustrated in FIG. 27 in an enlarged scale according to an exemplary embodiment of the present invention It is noted that, in describing the portable terminal with reference to FIGS. 27-34, according to the present exemplary embodiment, the components which are the same as those of the preceding exemplary embodiment or may be easily understood with reference to the preceding exemplary embodiment may be denoted by the same reference numerals or not denoted by any reference numerals, and the detailed descriptions may also be omitted.

Referring to FIGS. 27 to 34, the portable terminal 400 includes a single flat or bar-type housing 401 and a display device 111 installed on the front surface of the housing 401. The display device 111 may be incorporated with a touch screen function so as to provide an input device function. The terminal 400 includes a protection cover 402 and a dummy member 521 and is configured such that the mounting member 421 that forms a part of the protection cover 402 and the dummy member 521 may be selectively mounted in the mounting recess 415 provided on the rear surface of the housing 401.

The mounting recess 415 is formed at a side edge on the rear surface of the housing 401 and is depressed from the rear surface of the housing 401 by a predetermined depth so as to accommodate the dummy member 521 or the mounting member 421. Some connection holes provided in the terminal 400 may be formed in the mounting recess 415. As in the preceding exemplary embodiment, the terminal 400 also includes a plurality of connection holes. In general, an interface connector for connecting a personal computer, a charger or the like, an ear jack for connecting a sound inputting/outputting device or the like may be positioned on a side surface of the housing 401. The connection holes positioned in the mounting recess 415 or another surface of the housing 401 are opened/closed by the connection member 423 of the protection cover 402 as in the preceding exemplary embodiment. The present exemplary embodiment illustrates a construction in which connection holes 413 for connecting a Subscriber Identification Module (SIM) and a storage medium such as a memory card are formed in the mounting recess 415. Since the connection holes 413 are formed in the mounting recess 415, they are concealed by the mounting member 421 or the dummy member 521 mounted in the mounting recess 415.

Meanwhile, as illustrated in FIG. 31, the mounting member 421 may be provided with a protrusion 431. Likewise, the dummy member 521 may also be provided with such a protrusion. In the state where the mounting member 421 is mounted in the mounting recess 415, the protrusion 431 protrudes from the rear surface of the housing 401. Since the mounting member 421 or the dummy member 521 is positioned at a side of the rear surface of the housing 401, the protrusion 431 positions the display device 111 to be inclined in relation to a plane such as a desk when the housing 401 is disposed on the plane. Accordingly, the user may conveniently use the terminal 400 even without using a separate cradle.

A camera module 417, an illumination device for the camera module or the like may be provided in the mounting recess 415. Accordingly, the dummy member 521 and the mounting member 421 are formed with photographing openings 427 and 527, respectively to provide a photographing path of the camera module 417. When the illumination device is provided in the mounting recess 415, an illumination opening should also be provided in each of the dummy member 521 and the mounting member 421.

Referring to FIG. 34, in order to maintain the state in which the mounting member 421 is mounted in the mounting recess 415, the mounting member 421 is formed with a plurality of fastening studs 441 and the mounting recess 415 is formed with a plurality of fastening hole 419 (see FIG. 27) that correspond to the fastening studs 441, respectively. Although not illustrated, the dummy member 521 also includes a plurality of fastening studs that correspond to the fastening holes 419, respectively. As such, the mounting member 421 and the dummy member 521 may be selectively coupled and fixed to the housing 401, specifically, to the mounting recess 415.

The protection cover 402 includes a cover element 425 connected to the mounting member 421 through the connection member 423. In a state where the mounting member 421 is coupled to the mounting recess 415, the cover element 425 may open/close the display device 111. If the display device 111 is incorporated with a touch screen function, various sensors such as a proximity sensor or an illumination sensor are mounted on the front surface of the housing 401. For example, when the terminal 400 approaches a human body for the purpose of voice communication, the proximity sensor senses this and inactivates the touch screen function. The illumination sensor senses the intensity of illumination around the terminal 400 to adjust the brightness of the display device 111. In addition, for image communication or the like, a separate camera module, a microphone module and a speaker module may be arranged on the front surface of the housing 401.

Such inputting/outputting devices are generally used in the state where the display device 111 is opened. However, the speaker module may output a sound such as an incoming call ring. Accordingly, even in the state where the display device 111 is closed by the protection cover 402, specifically, by the cover element 425, some inputting/outputting devices should be maintained in the opened state. For this purpose, the cover element 425 is formed with an opening 429. FIG. 30 illustrates a state where the front surface of the housing 401 is partly opened through the opening 429 when the cover element 425 closes the display device 111. A device that requires performing an inputting/outputting operation even in the state where the display device 111 is closed may be preferably installed in the area that is opened through the opening 429.

An exemplary portable terminal including a protection cover configured as described above may protect a display device while allowing the unique external design of the terminal to be revealed. In addition, even if the protection cover is not used, the external design may be maintained by using a dummy member. Furthermore, since, in the state where the protection cover is mounted, the exposure of various connection holes is minimized, contamination by foreign matter may be prevented.

An exemplary portable terminal including a protection cover configured as described above has an advantage in that, since the protection cover may be arranged at an edge or a side surface or the rear surface of the housing by the mounting member, it is possible to minimize the increase of thickness of the terminal. As such, it is possible to contribute to improving the portability of the terminal. In addition, even if the protection cover is coupled, the difference of the terminal as compared to other products may be highlighted by causing the external appearance of the rear surface of the housing to be revealed, and the protection cover can be easily mounted or separated. Accordingly, the user may carry the terminal in the state where only the protection cover configured to open/close only the display device is coupled to the terminal. Furthermore, when the dummy member is coupled to the terminal to conceal the protection cover mounting portion in the state where the protection cover is separated, it is also possible to couple a conventional protection cover, i.e., a protection cover configured to enclose the rear surface and side surfaces of the terminal without mounting the inventive protection cover.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A portable terminal comprising:
    a mounting recess formed on a rear surface of a housing of the portable terminal;
    a mounting member configured to be capable of being attached to/detached from the mounting recess;
    a connection member configured to extend from the mounting member and to selectively enclose at least a part of the housing; and
    a cover element connected to an end of the connection member to open/close a display device installed on the front surface of the housing.

2. The portable terminal of claim 1, wherein the mounting member is configured to be capable of being attached to/detached from a portion adjacent to a side edge of a rear surface of the housing, and the connection member is configured to selectively enclose a side surface of the housing adjacent to the portion where the mounting member is attached/detached.

3. The portable terminal of claim 1, wherein the mounting recess is positioned adjacent to a side edge on the rear surface of the housing and extends in a longitudinal direction of the housing.

4. The portable terminal of claim 1, further comprising:
    a plurality of fastening holes formed in the mounting recess; and
    a plurality of fastening studs formed on an inner surface of the mounting member,
    wherein each of the fastening studs is engaged in one of the fastening holes to mount the mounting member on the housing.

5. The portable terminal of claim 4, wherein the mounting recess extends in the longitudinal direction of the housing, and the fastening holes are formed along opposite side edges of the mounting recess.

6. The portable terminal of claim 4, wherein the mounting member extends in the longitudinal direction of the housing, and the fastening studs are formed at opposite side edges of the mounting member.

7. The portable terminal of claim 6, wherein the fastening studs are directly engaged in the fastening holes at outer surfaces thereof, respectively, and
    the outer surfaces of the fastening studs positioned at one side edge of the mounting member and the outer surfaces of the fastening studs positioned at the other side edge of the mounting member are respectively provided with inclined protrusions which are formed to be more inclined away from each other as being positioned farther away from one end of the mounting member.

8. The portable terminal of claim 1, further comprising:
    an elongated channel formed on the housing and extending in a longitudinal direction of the housing; and
    a binding rib formed on an inner surface of the mounting member and extending in the longitudinal direction of the housing,
    wherein the binding rib is inserted into the elongated channel from one end of the elongated channel along the longitudinal direction of the housing to bind the mounting member to the housing.

9. The portable terminal of claim 1, further comprising:
    an elongated channel formed on the housing and extending in a longitudinal direction of the housing;
    a first binding rib protruding from an inner wall of the elongated channel; and
    a second binding rib formed on the inner surface of the mounting member and extending in the longitudinal direction of the housing,
    wherein the second binding rib is inserted into and bound to the elongated channel while wrapping at least a portion of the first binding rib to bind the mounting member to the housing.

10. The portable terminal of claim 1, further comprising:
    at least one slide hole formed in the housing; and
    a slide lever configured to be capable of being slid on the mounting member,
    wherein the slide lever is bound to an inner surface of the housing by being slid in a state where the slide lever is positioned in the slide hole to bind the mounting member to the housing.

11. The portable terminal of claim 1, further comprising:
    a fastening member fastened to the housing through the mounting member,
    wherein the mounting member is bound to the housing by the fastening member.

12. The portable terminal of claim 1, further comprising a dummy member coupled to the mounting recess in a state where the mounting member is not mounted.

13. The portable terminal of claim 12, further comprising:
a plurality of fastening holes formed at opposite side edges of the mounting recess, respectively; and
a plurality of fastening studs formed on an inner surface of the dummy member at opposite side edges of the inner surface of the dummy member, respectively, each of the fastening studs being engaged in one of the fastening holes,
wherein the outer surfaces of the fastening studs are directly engaged in the fastening holes, respectively, and the outer surfaces of the fastening studs positioned at one side edge of the dummy member and the outer surfaces of the fastening studs positioned at the other side edge of the dummy member are respectively provided with inclined protrusions which are formed to be more inclined away from each other as being positioned farther away from one end of the dummy member.

14. The portable terminal of claim 13, further comprising:
a separation recess formed at one end of the dummy member.

15. The portable terminal of claim 1, wherein the cover element is positioned to be inclined in a state where the cover element faces a rear surface of the housing so that the housing can be cradled to be inclined in relation to a plane.

16. The portable terminal of claim 15, further comprising:
at least one friction member provided on a side surface of the housing,
wherein, when the housing is cradled to be inclined in relation to the plane, the friction member and an edge of the cover element are supported on the plane.

17. The portable terminal of claim 1, further comprising:
an accommodating member provided at an edge of the cover element to couple an additional device.

18. A portable terminal comprising:
a housing having a display device installed on a front surface thereof;
a mounting recess formed on a rear surface of the housing;
at least one of a mounting member and a dummy member that are provided to be individually attachable to/detachable from the housing;
a connection member configured to extend from the mounting member and to selectively enclose at least a part of the housing; and
a cover element connected to an end of the connection member,
wherein either of the mounting member and the dummy member is coupled to the mounting recess, and, when the mounting member is coupled to the mounting recess, the cover element opens/closes the display device.

19. The portable terminal of claim 18, further comprising:
a plurality of fastening holes formed at opposite side edges of the mounting recess, respectively; and
a plurality of fastening studs formed at opposite side edges of the inner surface of each of the mounting member and the dummy member, respectively, each of the fastening studs being engaged in one of the fastening holes,
wherein outer surfaces of the fastening studs are directly engaged in the fastening holes, respectively.

20. The portable terminal of claim 19, wherein outer surfaces of the fastening studs positioned at one side edge of each of the mounting member and the dummy member and outer surfaces of the fastening studs positioned at the other side edge of each of the mounting member and the dummy member are respectively provided with inclined protrusions which are formed to be more inclined away from each other as being positioned farther away from one end of the dummy member.

21. The portable terminal of claim 20, further comprising:
a separation recess formed at one end of each of the mounting member and the dummy member.

22. The portable terminal of claim 18, further comprising:
an accommodating member provided at an edge of the cover element to couple an additional device.

23. The portable terminal of claim 18, further comprising:
at least one friction member provided on a side surface of the housing,
wherein the friction member and an edge of the cover element are supported on a plane in a state where the cover element is positioned to be inclined in relation to the housing so that the housing is cradled to be inclined in relation to the plane.

24. The portable terminal of claim 18, further comprising:
a camera module positioned in the mounting recess; and
a photographing opening formed in each of the mounting member and the dummy member,
wherein the mounting member or the dummy member is coupled to the mounting recess in a state where the photographing opening is aligned to the camera module.

25. The portable terminal of claim 18, wherein the mounting recess is positioned adjacent to a side edge on the rear surface of the housing, and, when the mounting member is coupled to the mounting recess, the connection member is positioned to enclose one side surface of the housing adjacent to the mounting recess.

26. The portable terminal of claim 25, further comprising:
a plurality of connection holes positioned on one side surface of the housing,
wherein the connection holes are opened/closed by the connection member.

27. The portable terminal of claim 18, further comprising:
an opening formed in the cover element to partially expose the front surface of the terminal.

28. The portable terminal of claim 27, wherein the opening is formed adjacent to the mounting member.

29. The portable terminal of claim 27, further comprising:
a protrusion formed on each of the mounting member and the dummy member,
wherein the protrusion protrudes to a rear surface of the terminal when the mounting member or the dummy member is coupled to the terminal.

30. The portable terminal of claim 27, further comprising:
at least one connection hole formed in the mounting recess,
wherein the connection hole is concealed by the mounting member or the dummy member.

* * * * *